(12) United States Patent
Lankford (10) Patent No.: US 11,510,529 B2
(45) Date of Patent: Nov. 29, 2022

(54) ROTATING CUTTING BOARD

(71) Applicant: Keifer Lankford, Glen Burnie, MD (US)

(72) Inventor: Keifer Lankford, Glen Burnie, MD (US)

( * ) Notice: Subject to any disclaimer, the term of this patent is extended or adjusted under 35 U.S.C. 154(b) by 0 days.

(21) Appl. No.: 17/678,169

(22) Filed: Feb. 23, 2022

(65) Prior Publication Data

US 2022/0313023 A1 Oct. 6, 2022

Related U.S. Application Data

(60) Provisional application No. 63/171,264, filed on Apr. 6, 2021.

(51) Int. Cl.
*A47J 47/00* (2006.01)

(52) U.S. Cl.
CPC ............................... *A47J 47/005* (2013.01)

(58) Field of Classification Search
CPC .................................................. A47J 47/005
See application file for complete search history.

(56) References Cited

U.S. PATENT DOCUMENTS

2010/0239407 A1* 9/2010 Mills ...................... A47G 19/10
248/205.8

* cited by examiner

*Primary Examiner* — Nirvana Deonauth
(74) *Attorney, Agent, or Firm* — Brennan, Manna & Diamond, LLC (57) ABSTRACT

The present invention relates to a rotating cutting board. The rotating cutting board is designed to firmly secure to a countertop via a series of suction cups disposed on the bottom surface of the cutting board. The rectangular or square-shaped cutting board features five separate suction cups on the bottom surface, in which a larger suction cup is positioned in the middle of the board and one smaller cup is positioned in each corner of the board. The larger suction cup elevates the board using a wooden slab connected through bearings to the board, such that the four small suction cups are lifted off the surface, ensuring that the board can rotate freely when the middle suction cup is secured. The suction cups ensure that the board remains stable while cutting to improve overall kitchen safety.

19 Claims, 8 Drawing Sheets

FIG. 8 ial Application No. 63/171,264, which was filed on Apr. 6th, 2021 and is incorporated herein by reference in its entirety.

ROTATING CUTTING BOARD

CROSS-REFERENCE TO RELATED APPLICATION

The present application claims priority to, and the benefit of, U.S. Provisional Application No. 63/171,264, which was filed on Apr. 6th, 2021 and is incorporated herein by reference in its entirety.

FIELD OF THE INVENTION

The present invention relates generally to the field of kitchen cutting boards. More specifically, the present invention relates to an improved cutting board that is capable of being firmly secured to a surface, such as a countertop, via a series of suction cups disposed on the bottom surface of the cutting board. The rectangular or square-shaped board features five suction cups on the bottom surface, in which a larger suction cup is positioned in the middle of the board and one smaller cup is positioned in each corner of the board. Accordingly, this disclosure makes specific reference thereto the present invention. Nonetheless, it is to be appreciated that aspects of the present invention are also equally applicable to other like applications, devices and methods of manufacture.

BACKGROUND

In general, during the process of cooking food, the initial step is to finely cut or chop the ingredients. It is common to use a cutting board as a base for cutting or chopping materials. Such boards are used for a variety of purposes, including meat cutting, bread slicing, vegetable chopping, etc. A cutting board provides a flat work surface to slice, dice, chop, pare, and otherwise process foods to their desired size, shape and/or consistency. A cutting board protects the surface on which it is placed from damage during this processing. The chopping is a necessary step and if done inefficiently, can delay the process of cooking, while also posing danger to the person chopping the material. The person can accidently injure his or her hands and especially the fingers. Conventional cutting boards can slip and slide on a counter surface while cutting items and can become a safety hazard.

Currently, individuals use ineffective methods for preventing slipping of the cutting board. For example, some individuals use a damp towel for a temporary solution. Alternatively, individuals may use a non-slip mat or install adhesive grips at the base of the cutting board. However, these methods are temporary, ineffective and do not eliminate the slipping and sliding of the cutting board for long periods of time.

Further, conventional cutting boards do not allow a person to cut items at different angles. A user has to manually change the orientation of the board by lifting the board from the surface and then changing the orientation, which is not only time-consuming but is also frustrating.

Therefore, there exists a long felt need in the art for an improved cutting board that securely sticks to a counter or tabletop. There is also a long felt need in the art for an improved cutting board that does not slip or slide while in use for cutting and chopping items. Additionally, there is a long felt need in the art for an improved cutting board that allows users to rotate the board to a desired position and angle. Moreover, there is a long felt need in the art for an improved cutting board that can be used in both home and commercial kitchens. Furthermore, there is a long felt need in the art for an improved cutting board that remains secured even while rotating to a desired position. Finally, there is a long felt need in the art for an improved cutting board that remains stabilized and secured while being used to improve overall kitchen safety.

The subject matter disclosed and claimed herein, in one embodiment thereof, comprises an improved cutting board. The improved cutting board has five integrated suction cups. The cutting board is a generally rectangular or square board that has four sides paired into two pairs of opposite and parallel sides, and also has four rounded corners, a top surface and a bottom surface. The cutting board further has four small suction cups and a bigger central suction cup wherein each suction cup is attached to the bottom surface. One small suction cup is positioned at each rounded corner on the bottom surface and the bigger central suction cup is positioned at the center of the bottom surface. The cutting board is elevated by the central suction cup, thereby lifting the four small suction cups and allowing rotation of the cutting board to a desired direction. All five cups are used for keeping the board stable on a flat surface.

In this manner, the cutting board of the present invention accomplishes all of the forgoing objectives and provides a relatively safe, sturdy and stable cutting board that remains stable and secure during use. The cutting board can be rotated and positioned in any desired position, thereby allowing a user to cut items from different angles. The suction cups secure the board, while the middle suction cup allows smooth rotation of the cutting board without any slipping or sliding.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a rotating cutting board with integrated suction cups. The rotating cutting board is a generally rectangular or square board having four sides paired in two pairs of opposite and parallel sides, four rounded corners with adjacent sides connected to each other at a rounded corner, a top surface, and a bottom surface. The cutting board further has four small suction cups and a bigger central suction cup, wherein each suction cup is attached to the bottom surface. One small suction cup is positioned at each rounded corner on the bottom surface and the bigger central suction cup is positioned at the center of the bottom surface, and the central suction cup is attached to the bottom surface through a rotating wooden slab wherein the cutting board is elevated by the central suction cup, thereby lifting the four small suction cups from the surface and allowing rotation of the cutting board to a desired direction.

In yet another embodiment of the present invention, a suction cup system for securing a cutting board to a surface and rotating it to a desired direction is disclosed. The suction cup system is designed to attach to a bottom surface of a rectangular or square cutting board having a top surface and a bottom surface. The system includes four small suction cups and a central suction cup, wherein the size of each small suction cup is the same and is relatively smaller than the central suction cup, the four small suction cups are positioned on the bottom surface, near the four rounded corners of the cutting board and the central suction cup is positioned at the center of the bottom surface. The central suction cup elevates the cutting board, thereby lifting the four small suction cups from the surface, while the central suction cup remains secured to the surface. This elevation allows a wooden slab, positioned between the central suction cup and the bottom surface, to rotate the cutting board without any slippage or sliding on the surface.

In yet another embodiment of the present invention, a method for rotating a cutting board, while remaining secured to a surface is disclosed. The method includes the steps of initially placing the cutting board on a surface, wherein the suction cups contact the surface, securing the cutting board in place for processing a food item. Then, elevating the cutting board by holding the sides of the board and lifting the board, such that the small suction cups positioned on the corners are lifted up from the surface, while the central suction cup positioned at the center remains secured to the surface. Thereafter, rotating the cutting board to a desired direction and angle, while the cutting board remains secured to the surface. Finally, once the cutting board is in the desired position, then securing the cutting board to the surface in the desired position via sticking the small suction cups to the surface.

In yet another embodiment, the cutting board of the present invention features five separate suction cups on the bottom surface in which a larger suction cup in the middle of the board facilitates rotation, while four smaller cups in the corner help firmly secure the board.

In yet another embodiment of the present invention, the larger suction cup installed in the middle of the board elevates the board and the small suction cups on the corners lift upward ensuring that the board can rotate freely, when the middle suction cup is secured to a surface.

In yet another embodiment, the top surface of the cutting board contains a groove along the periphery allowing juices or any fluid to be collected, to prevent spillage on the surface where the cutting board is placed.

The cutting board of the present invention is a multifaceted cutting board with many applicable uses in both home and commercial kitchens, and allows users to rotate the board to a desired position and angle for cutting food into specific lengths, shapes and more. The suction cups can be applied to a flat surface and act to keep the board stable, while cutting and chopping items to improve overall kitchen safety.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long felt need in the art for an improved cutting board that securely sticks to a counter or tabletop. There is also a long felt need in the art for an improved cutting board that does not slip or slide, while in use for cutting and chopping items. Additionally, there is a long felt need in the art for an improved cutting board that allows users to rotate the board to a desired position and angle. Moreover, there is a long felt need in the art for an improved cutting board that can be used in both home and commercial kitchens. Furthermore, there is a long felt need in the art for an improved cutting board that remains secure, even while being rotated to a desired position. Finally, there is a long felt need in the art for an improved cutting board that remains stable and secure, while being used to improve overall kitchen safety.

The present invention, in one exemplary embodiment, is a novel method for rotating a cutting board while remaining secured to a surface. The method includes the steps of initially placing the cutting board on a surface, with the suction cups contacting the surface, for a secure and stable placement for processing a food item. The method also includes elevating the cutting board by holding the sides of the board and lifting the board, such that the small suction cups positioned on the corners are lifted off the surface, while the central suction cup positioned at the center remains secured to the surface. Thereafter, rotating the cutting board to a desired direction and angle while the cutting board remains secured to the surface. Finally, once the cutting board is in the desired position, then securing the cutting board to the surface in the desired position via sticking the small suction cups to the surface.

Figure 1:
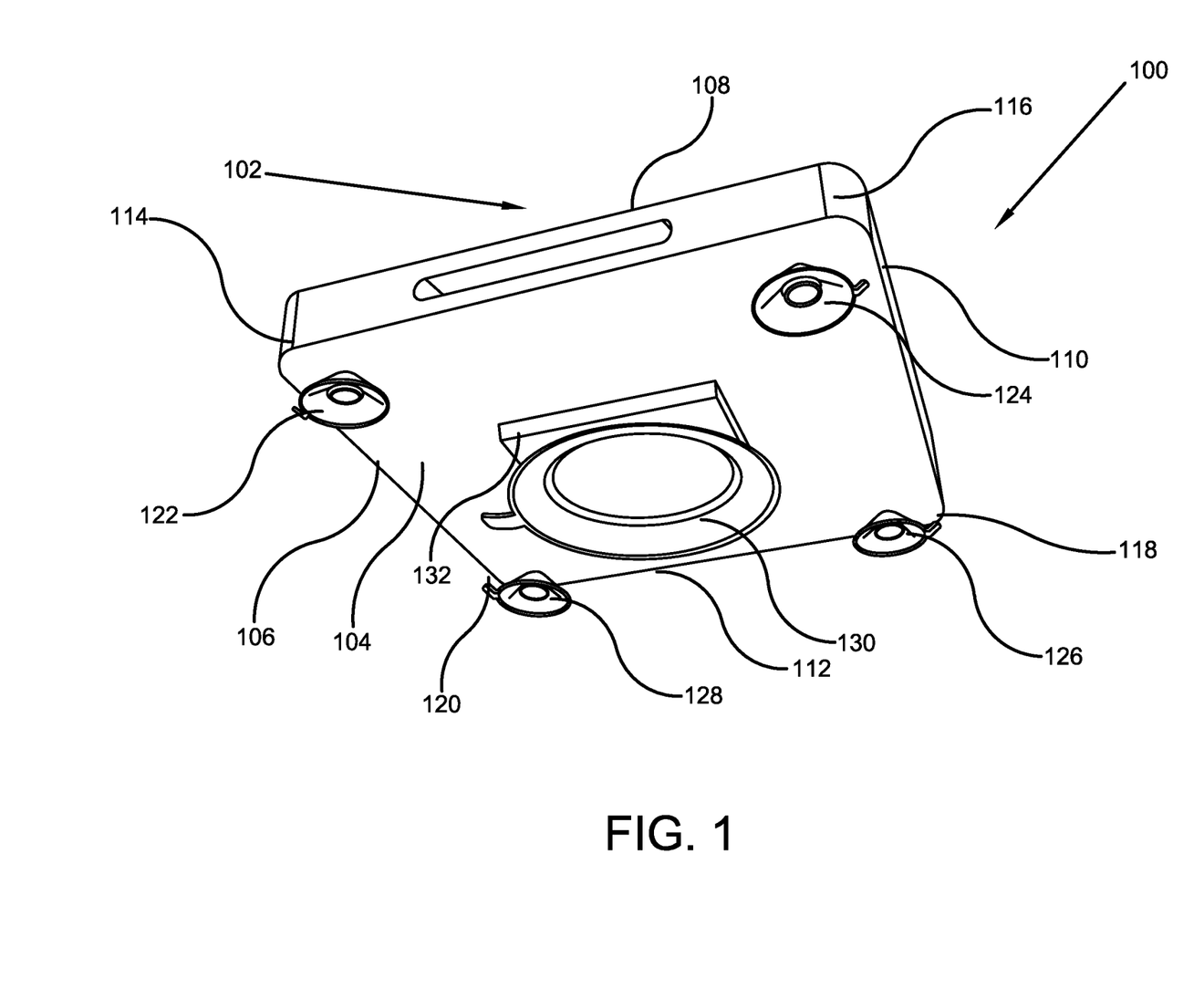
FIG. 1 illustrates a perspective view of one potential embodiment of the rotating cutting board of the present invention in accordance with the disclosed architecture.

Referring initially to the drawings, FIG. 1 illustrates a perspective view of one embodiment of the rotating cutting board 100 of the present invention. The rotating cutting board 100 of the present invention is designed to be firmly secured and stabilized to a flat surface and can be rotated to a desired position, while being secured to the flat surface. The cutting board 100 is a generally square or rectangular-shaped flat board, or any other suitable shape as is known in the art. The cutting board 100 has a top surface 102 and a bottom surface 104. Typically, the cutting board 100 has two pairs of opposing sides; a first pair of opposing and parallel sides 106, 110 and a second pair of opposing and parallel sides 108, 112, however any number of opposing sides can be utilized as is known in the art. The cutting board 100 typically has four rounded corners 114, 116, 118, 120, but can have any number of suitable corners as is known in the art. Further, the first side 106 and the second side 108 have a first common rounded corner 114. Similarly, the second side 108 and the third side 110 have a second common rounded corner 116. The third side 110 and the fourth side 112 have a third common rounded corner 118. The fourth side 112 and the first side 106 have a fourth common rounded corner 120.

Furthermore, the top surface 102 is used for placing a food item for cutting and chopping and the bottom surface 104 is used for placing the cutting board 100 on a surface. More specifically, for securing and stabilizing the rotating cutting board 100 on a surface, the bottom surface 104 has five suction cups; a small suction cup positioned at each of the four rounded corners and a central large suction cup positioned at the center of the bottom surface 104. As shown, a first suction cup 122 is disposed near the first common rounded corner 114, a second suction cup 124 is disposed near the second common rounded corner 116, a third suction cup 126 is disposed near the third common rounded corner 118 and a fourth suction cup 128 is disposed near the fourth common rounded corner 120. The central large suction cup 130 is positioned at the center of the bottom surface 104.

Each of the small suction cups 122, 124, 126, 128 and the large suction cup 130 secure to a surface for stabilizing and securing the cutting board 100. The suction cups stick to any surface, without harming the surface upon which they are stuck. The suction cups, when stuck to the surface, eliminate any sliding and slipping of the cutting board 100. Each suction cup is made of a soft rubber that is impenetrable by air. The suction cups have a concave head and a dome-like side area that spreads when the suction cup is applied to a surface, as best described below in FIG. 3. Each suction cup can be pressed to any surface by exerting pressure on the top surface 102 of the cutting board 100, such that air is pushed inside each suction cup, thus creating a vacuum to tightly seal the suction cups to the surface.

It should be noted that the size of each of the small suction cups 122, 124, 126, 128 is approximately the same, and they each create approximately the same vacuum to secure the cutting board 100 to a surface. Further, the size of the central suction cup 130 is relatively bigger than the other smaller suction cups. All of the suction cups allow the cutting board 100 to be slightly above the surface on which the cutting board 100 is placed, and thus effectively protect the surface on which the cutting board 100 is placed from damage during use. The central suction cup 130 can be used for rotating the cutting board 100, without moving the cutting board 100 physically from one place to another, and for cutting food items in a desired angle. The central suction cup 130 can be elevated by raising the head of the central suction cup 130.

The cutting board 100 can be made from sturdy BPA-free plastic, wood, granite, stainless steel or any other suitable material that can be rinsed or washed either by hand or by placing inside a dishwasher for cleaning. The cutting board 100 can be of any geometric shape and can be of any size based on a user's needs and/or wants. Preferably, the cutting board 100 can be available in 12" (L)×12" (W)×1" (H) or 18" (L)×12" (W)×1" (H) or 20" (L)×15" (W)×1.5" (H) or 18" (L)×24" (W)×2" (H) or 12" (L)×8" (W)×1" (H).

The central suction cup 130 is bigger in size than the smaller suction cups 122, 124, 126, 128, and is attached to the center of the bottom surface 104 through a thin wooden slab 132. The central suction cup 130 is designed to elevate the cutting board 100 by pulling the board 100 vertically upwards and when the central suction cup 130 is elevated, the small suction cups 122, 124, 126, 128 are pulled up from the surface to which they were stuck (while the central suction cup 130 remains stuck to the surface), thus allowing the cutting board 100 to rotate to a desired orientation, and then the cutting board 100 can be secured in place and lowered by depressing the central suction cup 130. Specifically, when the central suction cup 130 is depressed, by pressing the top surface 102 of the board 100, the small suction cups 122, 124, 126, 128 stick to the surface. In this way, the central suction cup 130, which is larger in size than the smaller suction cups, allows for rotation of the cutting board 100, while the cutting board remains secured and stabilized to a surface.

More specifically, the wooden slab 132 to which the central suction cup 130 is attached is coupled to the bottom surface 104, thus allowing the cutting board 100 to rotate. The wooden slab 132 can have bearings (shown in FIG. 4) allowing the cutting board 100 to rotate. It should be appreciated that the cutting board 100 rotates horizontally 360 degrees and does not tilt in any direction during rotation, and therefore maintains a perfect horizontal top surface 102 for chopping and cutting items. All of the suction cups together eliminate the need for non-slip mats for the cutting board 100 to avoid slipping, shaking and noise.

Figure 2:
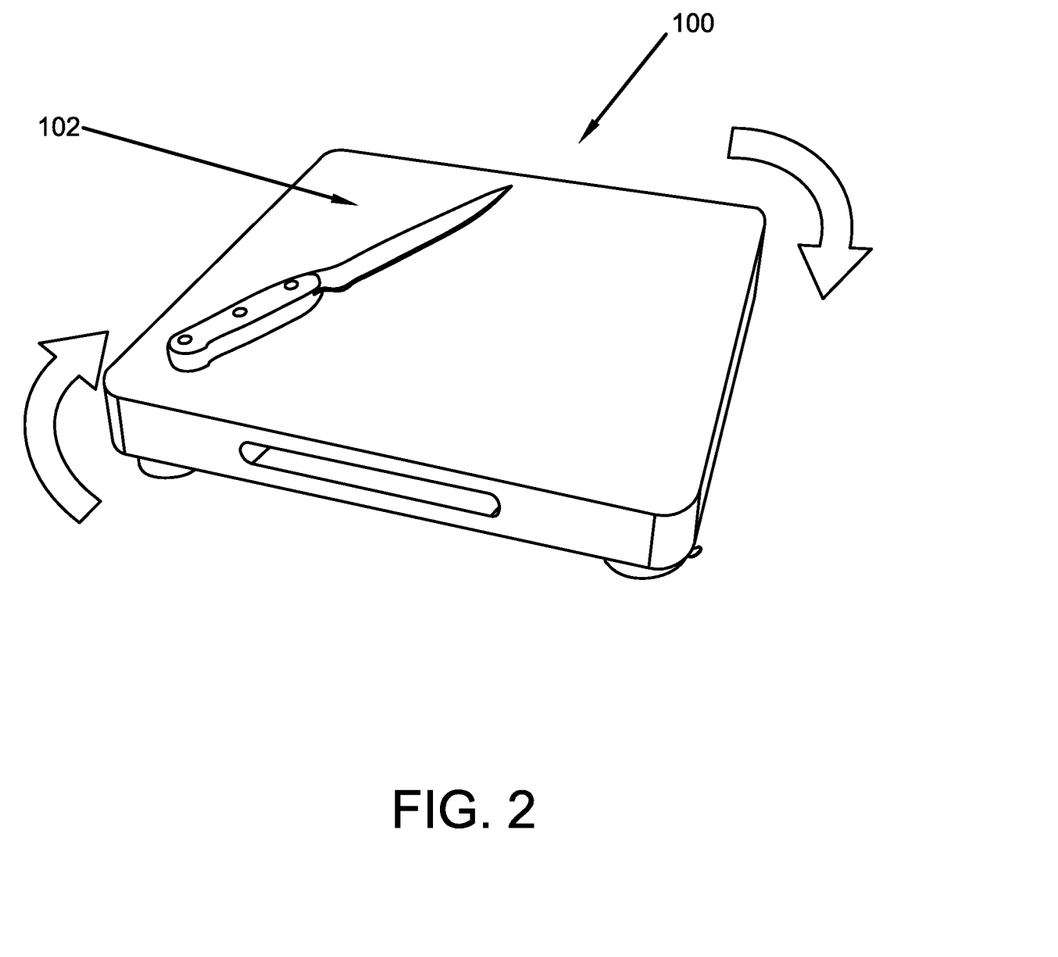
FIG. 2 illustrates a top perspective view of one potential embodiment of the rotating cutting board of the present invention in accordance with the disclosed architecture.

FIG. 2 illustrates a top perspective view of the rotating cutting board 100 of the present invention. The top surface 102 of the cutting board 100 is a planar, rugged, scratch-less and flat work surface to slice, dice, chop, pare, and otherwise process foods to their desired size, shape and/or consistency. The top surface 102 remains stable and horizontal, thereby allowing a user to use the cutting board 100 effectively.

Figure 3:
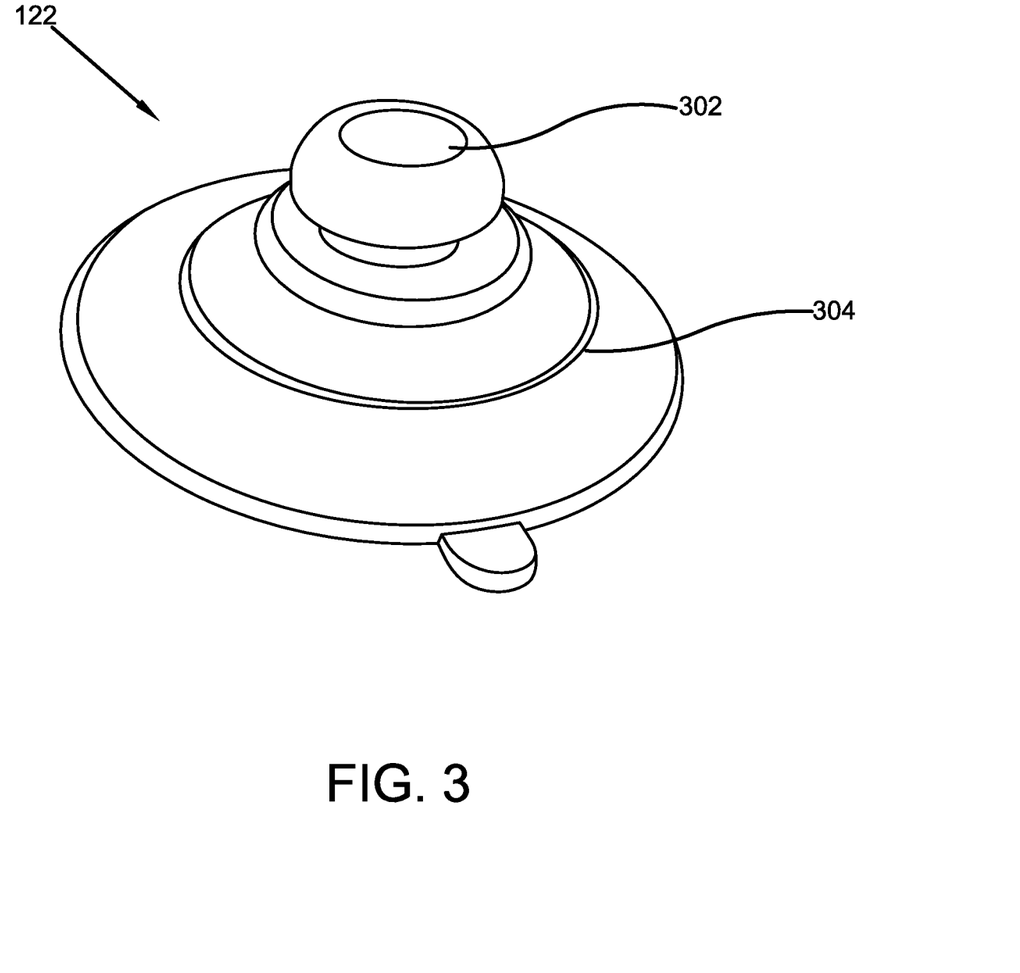
FIG. 3 illustrates a perspective view showing an exemplary suction cup used in one potential embodiment of the rotating cutting board of the present invention in accordance with the disclosed architecture.

FIG. 3 illustrates a perspective view showing an exemplary suction cup used in the rotating cutting board 100 of the present invention. The exemplary suction cup described herein is the first small suction cup 122 and the same structure can be used for the other small suction cups 124, 126, 128 and/or central suction cup 130. The suction cup 122 shown has a head 302 and a concave sliding side 304. The head 302 is attached to the bottom surface 104 of the cutting board 100, such that the sliding side 304 creates negative pressure to adhere to a surface by creating a vacuum. More specifically, when the head 302 is pushed downward, air is trapped inside the concave side 304, creating a vacuum which allows the suction cup 122 to stick to any surface.

Figure 4:
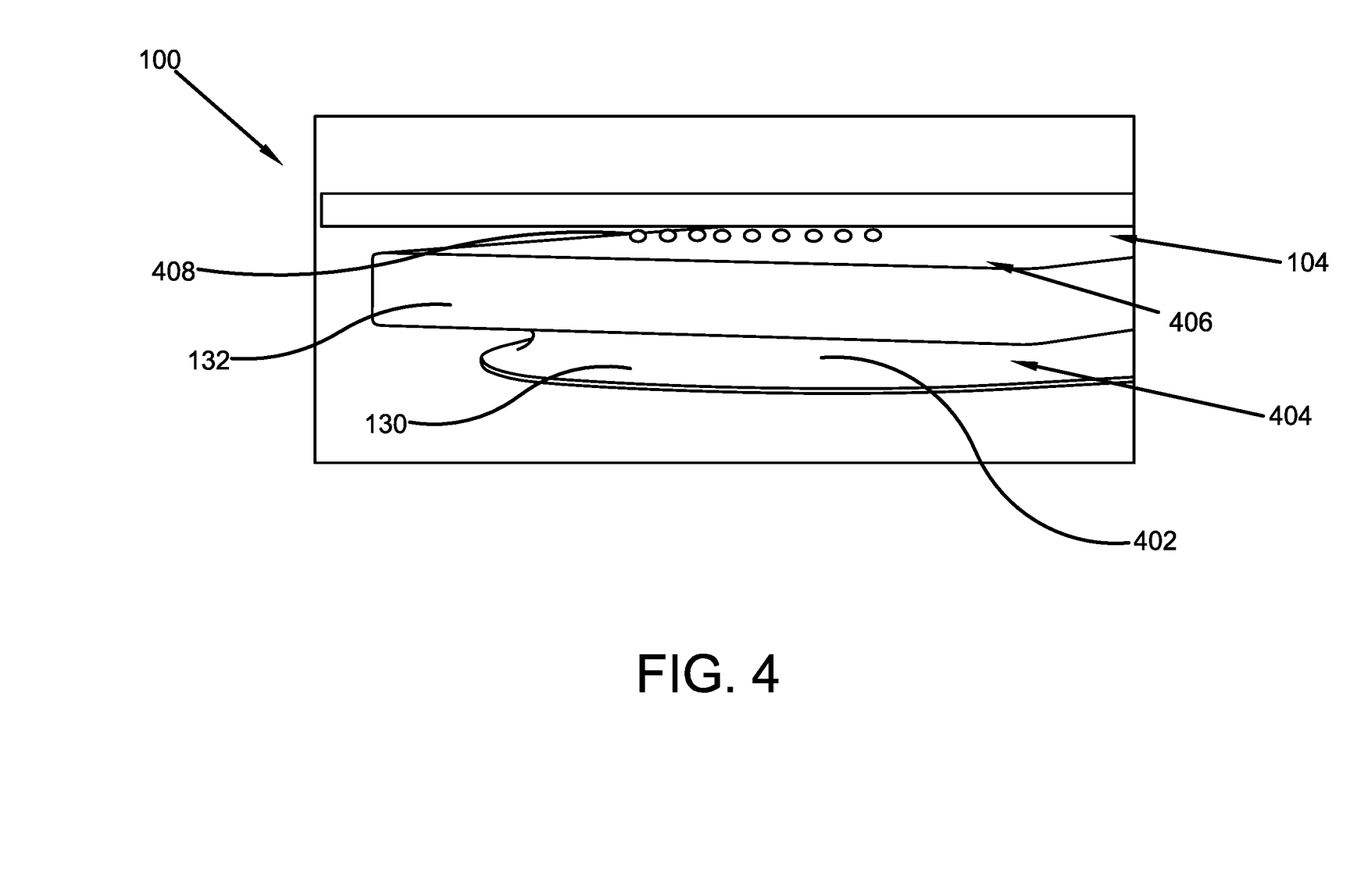
FIG. 4 illustrates a close-up view of the rotating connection of a wooden slab with a bottom surface of one potential embodiment of the cutting board of the present invention, which allows rotation of the board using a central suction cup in accordance with the disclosed architecture.

FIG. 4 illustrates a close-up view of the rotating connection of the wooden slab 132 with the bottom surface 104 of the cutting board 100. The head 402 of the central suction cup 130 is attached to the base 404 of the wooden slab 132 and the top surface 406 of the wooden slab 132 is attached to the bottom surface 104 of the cutting board 100 via rotating bearings 408. As stated supra, when the cutting board 100 is elevated using the central suction cup 130, the small suction cups positioned on the bottom surface 104, at corners of the cutting board 100 are lifted off of the surface, which allows the user to rotate the cutting board 100 via the bearings 408, while the central suction cup 130 is secured to the surface.

Figure 5:
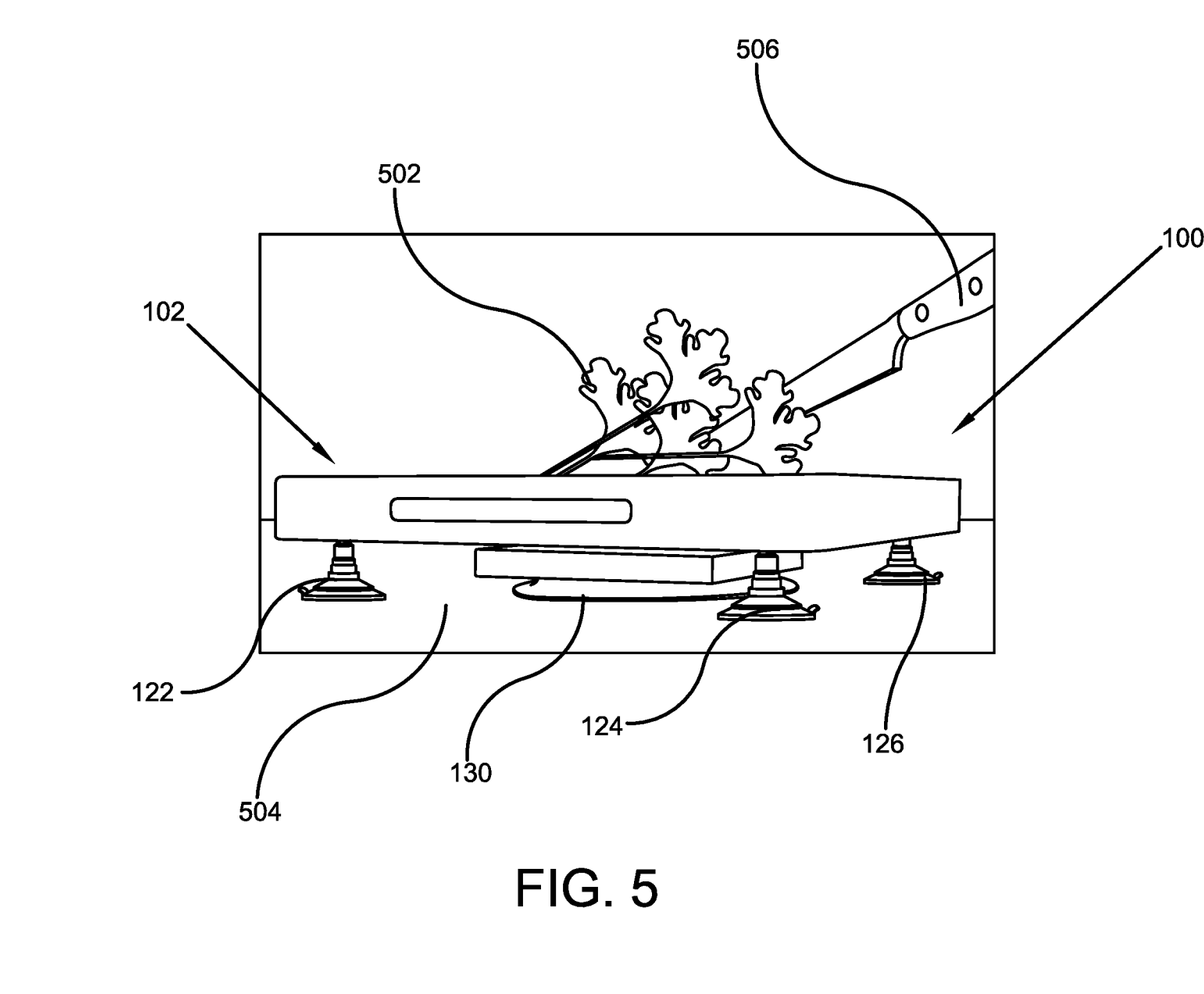
FIG. 5 illustrates a perspective view showing a food item being chopped with a knife on one potential embodiment of the rotating cutting board of the present invention in accordance with the disclosed architecture.

FIG. 5 illustrates a perspective view showing an item 502 being chopped using a knife 506 on the cutting board 100 of the present invention. As shown, during use, the cutting board 100 is securely placed in a stabilized manner on a surface 504 using the small suction cups 122, 124, 126, 128 (not shown in this FIG.) and the central suction cup 130. The suction cups do not allow the cutting board 100 to slip and slide on any surface during use. The food item 502 is kept on the top surface 102 of the cutting board 100, and any suitable chopping or cutting device as is known in the art, such as a knife 506, can be used on the top surface 102 of the cutting board 100 for slicing, chopping and performing any other method on the food item 502. The central suction cup 130 can be used for rotating the cutting board 100 into any desired direction, allowing chopping and cutting in various angles.

Figure 6:
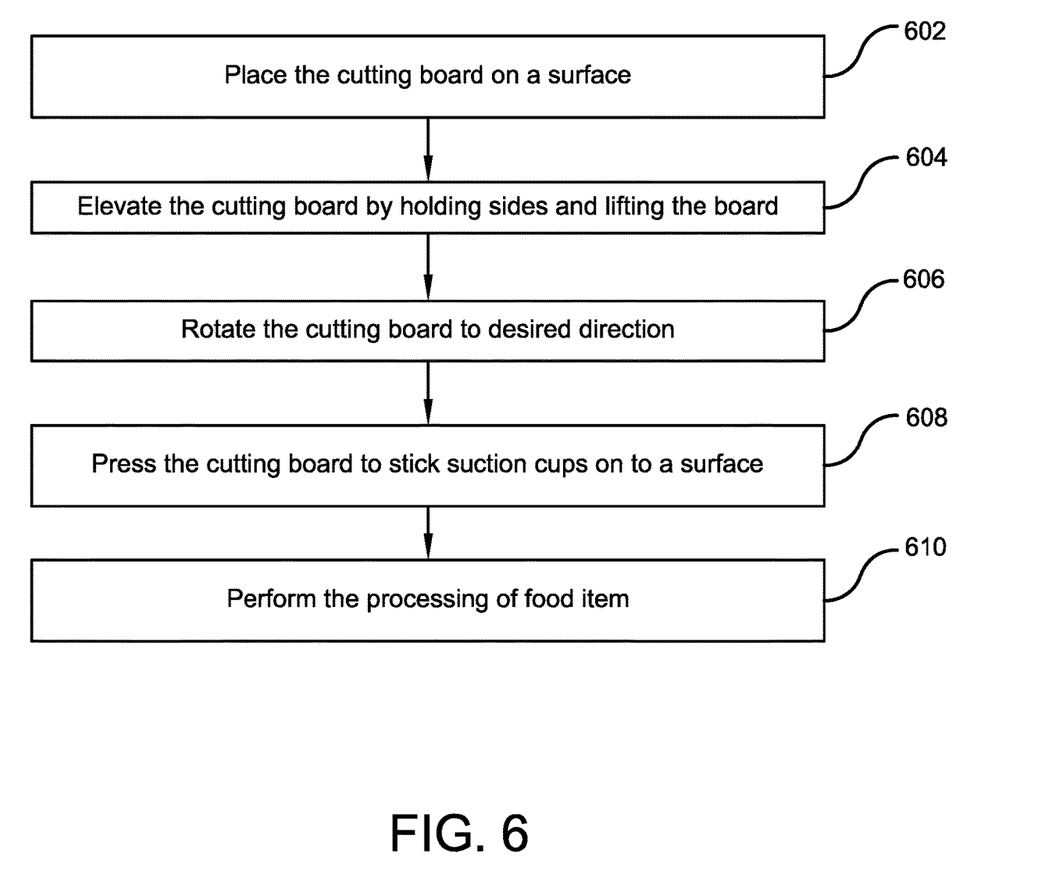
FIG. 6 illustrates a flow diagram showing the exemplary steps performed for rotating one potential embodiment of the cutting board of the present invention in accordance with the disclosed architecture.

FIG. 6 illustrates a flow diagram showing the exemplary steps performed for rotating the cutting board 100 of the present invention. It should be understood that the present embodiment states the basic flow performed by a user and additional actions may be used to add additional processes to the basic flow. Initially at 602, the cutting board is placed on a surface with the suction cups secured on the surface, for a secure and stable placement for processing a food item. Then at 604, when changing direction of the cutting board, the cutting board is elevated by holding the sides of the cutting board, such that the small suction cups are lifted off of the surface, while the central suction cup remains secured to the surface. Thereafter, at 606 the cutting board is rotated using the wooden slab, to a desired direction and angle. Then at 608, when securing the cutting board on a surface in a desired direction, the cutting board is pressed such that the small suction cups stick onto the surface. Finally at 610, the user performs the processing of food items in the desired direction without any slipping or sliding of the cutting board.

Figure 7:
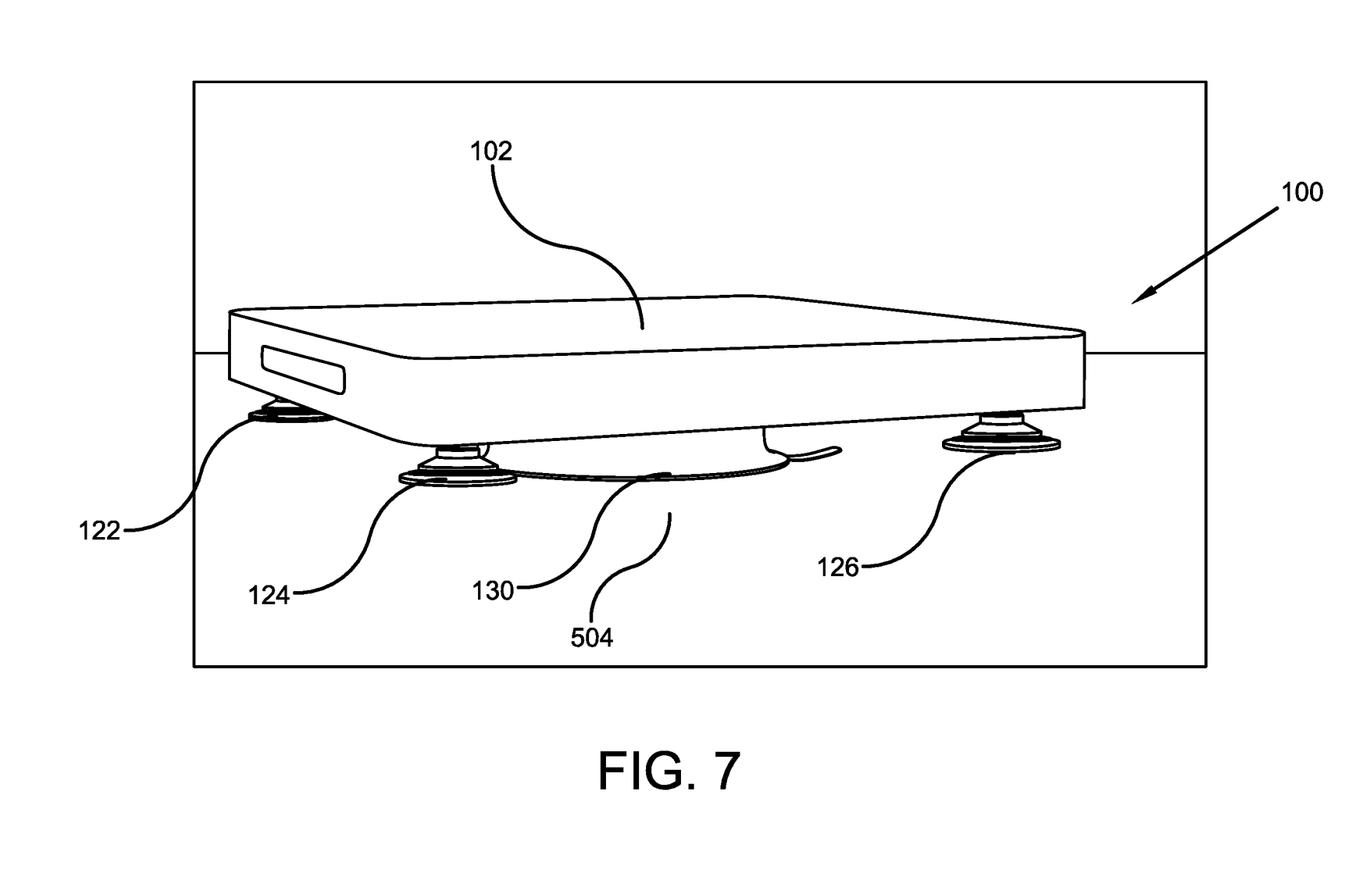
FIG. 7 illustrates a perspective view showing one potential embodiment of the rotating cutting board of the present invention in an elevated position and with the small suction cups lifted off the surface in accordance with the disclosed architecture.

FIG. 7 illustrates a perspective view showing the rotating cutting board of the present invention in an elevated position, with the small suction cups lifted off of the surface. When the rotating cutting board 100 is elevated for rotating to a desired direction, the central suction cup 130 remains secured to the surface 504, while the smaller suction cups 126, 128, 124, 122 are lifted and pulled from the surface 504. This allows the cutting board 100 to rotate around the central suction cup 130, as the smaller suction cups do not stabilize the cutting board 100. Once a desired direction is reached, then the cutting board 100 is lowered, thereby allowing the smaller suction cups to adhere to the surface 504, and thus preventing further rotation of the cutting board 100, while still maintaining security and stability of the cutting board 100 on the surface.

Figure 8:
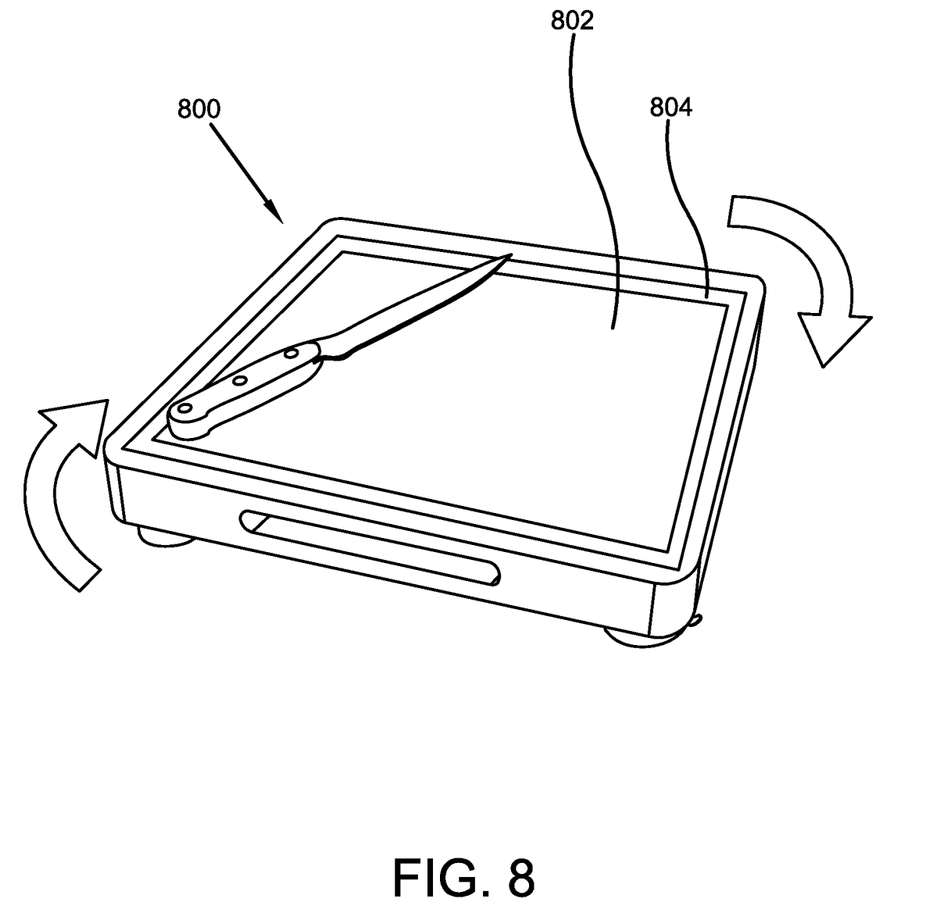
FIG. 8 illustrates a perspective view of another potential embodiment of the rotating cutting board of the present invention in accordance with the disclosed architecture.

FIG. 8 illustrates a perspective view of another embodiment of the rotating cutting board of the present invention. The rotating cutting board 800 of the present embodiment has a deep groove 804 along the periphery of the top surface 802. The groove 804 is used for collecting any juice or liquid of the food item being processed on the cutting board 800. In alternative embodiments, the groove 804 can be selectively placed along any side of the cutting board 800, or along only one side of the cutting board 800.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "rotating cutting board", "cutting board", "stable cutting board", "board", and "improved cutting board" are interchangeable and refer to the rotating cutting board 100, 800 of the present invention.

Notwithstanding the forgoing, the rotating cutting board 100, 800 of the present invention can be of any suitable size and configuration as is known in the art without affecting the overall concept of the invention, provided that it accomplishes the above-stated objectives. One of ordinary skill in the art will appreciate that the size, configuration, and material of the rotating cutting board 100, 800 as shown in FIGS. 1-8 is for illustrative purposes only, and that many other sizes and shapes of the rotating cutting board 100, 800 are well within the scope of the present disclosure. Although the dimensions of the rotating cutting board 100, 800 are important design parameters for user convenience, the rotating cutting board 100, 800 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A cutting board configured for remaining secure to a surface even while being rotated to a desired position, the cutting board comprising:
a top surface for placing a food item for cutting or chopping;
a bottom surface for placing the cutting board on the surface;
a plurality of small suction cups positioned on a perimeter of the bottom surface; and a central large suction cup positioned at a center of the bottom surface, wherein the central large suction cup is relatively bigger than each of the plurality of small suction cups, wherein the plurality of small suction cups and the central large suction cup act to elevate above and secure the cutting board to the surface, and further wherein the central large suction cup is configured for rotating the cutting board relative to the surface.

2. The cutting board of claim 1, wherein the cutting board is rectangular or square in shape.

3. The cutting board of claim 2, wherein the cutting board comprises a first pair of opposing and parallel sides and a second pair of opposing and parallel sides.

4. The cutting board of claim 3 further comprising four rounded corners.

5. The cutting board of claim 4, wherein the plurality of small suction cups comprises four small suction cups.

6. The cutting board of claim 5, wherein one of the four small suction cups is positioned on the bottom surface at each of the four rounded corners.

7. The cutting board of claim 6, wherein each of the four small suction cups are approximately the same dimensions.

8. The cutting board of claim 7, wherein the central large suction cup is elevated by raising a head of the central large suction cup.

9. The cutting board of claim 8, wherein raising the head of the central large suction cup detaches the four small suction cups from the surface.

10. The cutting board of claim 9, wherein the central large suction cup is secured to the bottom surface via a wooden slab.

11. The cutting board of claim 10, wherein the head of the central large suction cup is attached to a base of the wooden slab, and a top surface of the wooden slab is attached to the bottom surface of the cutting board via rotating bearings.

12. The cutting board of claim 11, wherein when the four small suction cups are detached from the surface, the cutting board rotates via the rotating bearings while the central large suction cup remains secured to the surface.

13. A cutting board configured for remaining secure to a surface even while being rotated to a desired position, the cutting board comprising:
a top surface for receiving a food item;
a bottom surface for placing the cutting board on the surface;
a first pair of opposing and parallel sides;
a second pair of opposing and parallel sides;
a set of four rounded corners;
a set of four small suction cups, wherein each of said set of four small suction cups is positioned at one of said set of four rounded corners and on the bottom surface; and
a central large suction cup positioned at a center of the bottom surface and secured via a wooden slab; wherein the central large suction cup is relatively bigger than each of the set of four small suction cups;
wherein the set of four small suction cups and the central large suction cup act to elevate above and secure the cutting board to the surface;
wherein a head of the central large suction cup is attached to a base of the wooden slab and a top surface of the wooden slab is attached to the bottom surface of the cutting board via rotating bearings; and
further wherein the central large suction cup is configured for rotating the cutting board via the rotating bearings without laterally moving the cutting board.

14. The cutting board of claim 13, wherein the central large suction cup comprise a concave sliding side and each of the set of four small suction cups comprise a head and a concave sliding side.

15. The cutting board of claim 14, wherein each of the heads are attached to the bottom surface of the cutting board.

16. The cutting board of claim 15, wherein pushing downward on each of the heads causes air to be trapped in a respective concave sliding side of each of the concave sliding sides, thereby creating a negative pressure or a vacuum to adhere each of the concave sliding sides to the surface.

17. The cutting board of claim 16, wherein raising the head of the central large suction cup pulls each of the set of four small suction cups from the surface, and when each of the set of four small suction cups are pulled from the surface, the cutting board rotates via the rotating bearings while the central large suction cup remains secured to the surface.

18. The cutting board of claim 4 further comprising a groove along a periphery of the top surface for collecting a liquid.

19. A method of rotating a cutting board comprising the steps of:
providing a cutting board configured for remaining secure to a surface even while being rotated to a desired position, the cutting board comprising:
a top surface for placing a food item for cutting or chopping;
a bottom surface for placing the cutting board on the surface;
a plurality of small suction cups positioned on a perimeter of the bottom surface; and a central large suction cup positioned at a center of the bottom surface, wherein the central large suction cup is relatively bigger than each of the plurality of small suction cups, wherein the plurality of small suction cups and the central large suction cup act to elevate above and secure the cutting board to the surface, and further wherein the central large suction cup is configured for rotating the cutting board relative to the surface,
further comprising the steps of:
positioning the cutting board on the surface with the plurality of small suction cups and the large suction cup secured to the surface;
elevating the cutting board by holding a side of the cutting board, such that the plurality of small suction cups are lifted off of the surface, while the large suction cup remains secured to the surface;
rotating the cutting board using the wooden slab to a desired direction and angle;
securing the cutting board on the surface in a desired direction via pressing down on the plurality of small suction cups of the cutting board, such that the plurality of small suction cups stick onto the surface; and processing a food item on the cutting board without any slipping or sliding of the cutting board relative to the surface.

\* \* \* \* \*